US011409484B2

(12) United States Patent
Kusumoto

(10) Patent No.: US 11,409,484 B2
(45) Date of Patent: Aug. 9, 2022

(54) SYSTEM, METHOD OF CONTROLLING SPECIFIC PRINTER, NON-TRANSITORY COMPUTER-READABLE STORAGE MEDIUM, TERMINAL DEVICE, AND COMBINATION OF NON-TRANSITORY COMPUTER-READABLE STORAGE MEDIA

(71) Applicant: BROTHER KOGYO KABUSHIKI KAISHA, Nagoya (JP)

(72) Inventor: Naoki Kusumoto, Toyohashi (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 16/798,584

(22) Filed: Feb. 24, 2020

(65) Prior Publication Data

US 2020/0272383 A1 Aug. 27, 2020

(30) Foreign Application Priority Data

Feb. 27, 2019 (JP) .............................. JP2019-033694

(51) Int. Cl.
*G06F 3/12* (2006.01)
*H04N 1/00* (2006.01)

(52) U.S. Cl.
CPC .......... *G06F 3/1243* (2013.01); *G06F 3/1204* (2013.01); *G06F 3/1205* (2013.01); *H04N 1/00403* (2013.01)

(58) Field of Classification Search
CPC .... G06F 3/1243; G06F 3/1204; G06F 3/1205; G06F 3/1257; G06F 3/167; G06F 3/1289; H04N 1/00403; H04N 1/00973
See application file for complete search history.

(56) References Cited

U.S. PATENT DOCUMENTS

| 2014/0146333 | A1* | 5/2014 | Shiohara | G06F 3/1293 358/1.13 |
| 2015/0281388 | A1* | 10/2015 | Mori | G06F 3/1209 709/202 |
| 2016/0360477 | A1* | 12/2016 | Saeki | G06F 3/1226 |
| 2019/0018624 | A1* | 1/2019 | Naruse | G06F 3/1294 |
| 2020/0175982 | A1* | 6/2020 | Nakamura | H04N 1/00244 |

FOREIGN PATENT DOCUMENTS

JP 2012-073739 A 4/2012

* cited by examiner

*Primary Examiner* — Iriana Cruz
(74) *Attorney, Agent, or Firm* — Scully Scott Murphy and Presser

(57) ABSTRACT

A system including a server and a terminal device controls a specific printer. The server includes an input acquisition unit that acquires input data generated based on sound data indicating voice by an utterer and transmitted from a voice input device to which the voice is input, and a print instruction output unit that outputs print instruction data indicating an instruction relating to a print job to be executed by the specific printer, by using the input data. The terminal device includes a print instruction receiving unit that receives the print instruction data transmitted from the server via a first communication interface, a print job generation unit that generates print job data indicating a print job to be executed by the specific printer, by using the print instruction data, and a print job transmission unit that transmits the print job data to the specific printer via a second communication interface.

7 Claims, 5 Drawing Sheets

FIG. 2A

CT1 — TRANSMISSION DESTINATION SELECTION TABLE

| USER ID | DEVICE TOKEN |
|---|---|
| USER_A | DTK_A |
| USER_B | DTK_B |
| USER_C | DTK_C |
| ⋮ | ⋮ |

FIG. 2B

CT2 — TEMPLATE SELECTION TABLE

| WORD | TEMPLATE |
|---|---|
| LABEL A | TEMPLATE DATA A |
| LABEL B | TEMPLATE DATA B |
| NAMEPLATE | TEMPLATE DATA C |
| ⋮ | ⋮ |

FIG. 2C

CT3 — CONTENT SELECTION TABLE

| WORD | IMAGE |
|---|---|
| Alice | IMAGE DATA A |
| Ken | IMAGE DATA B |
| Kate | IMAGE DATA C |
| ⋮ | ⋮ |

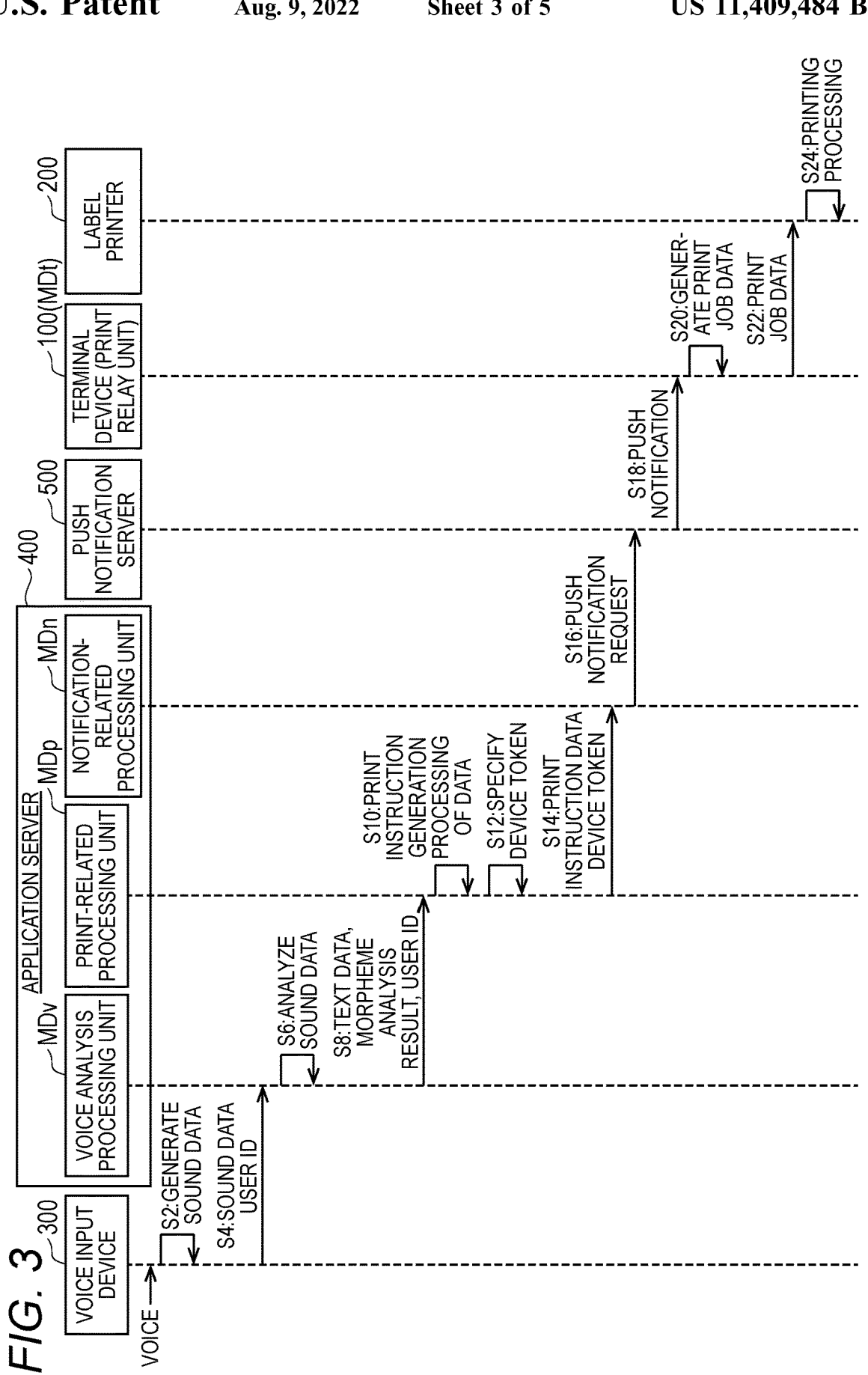

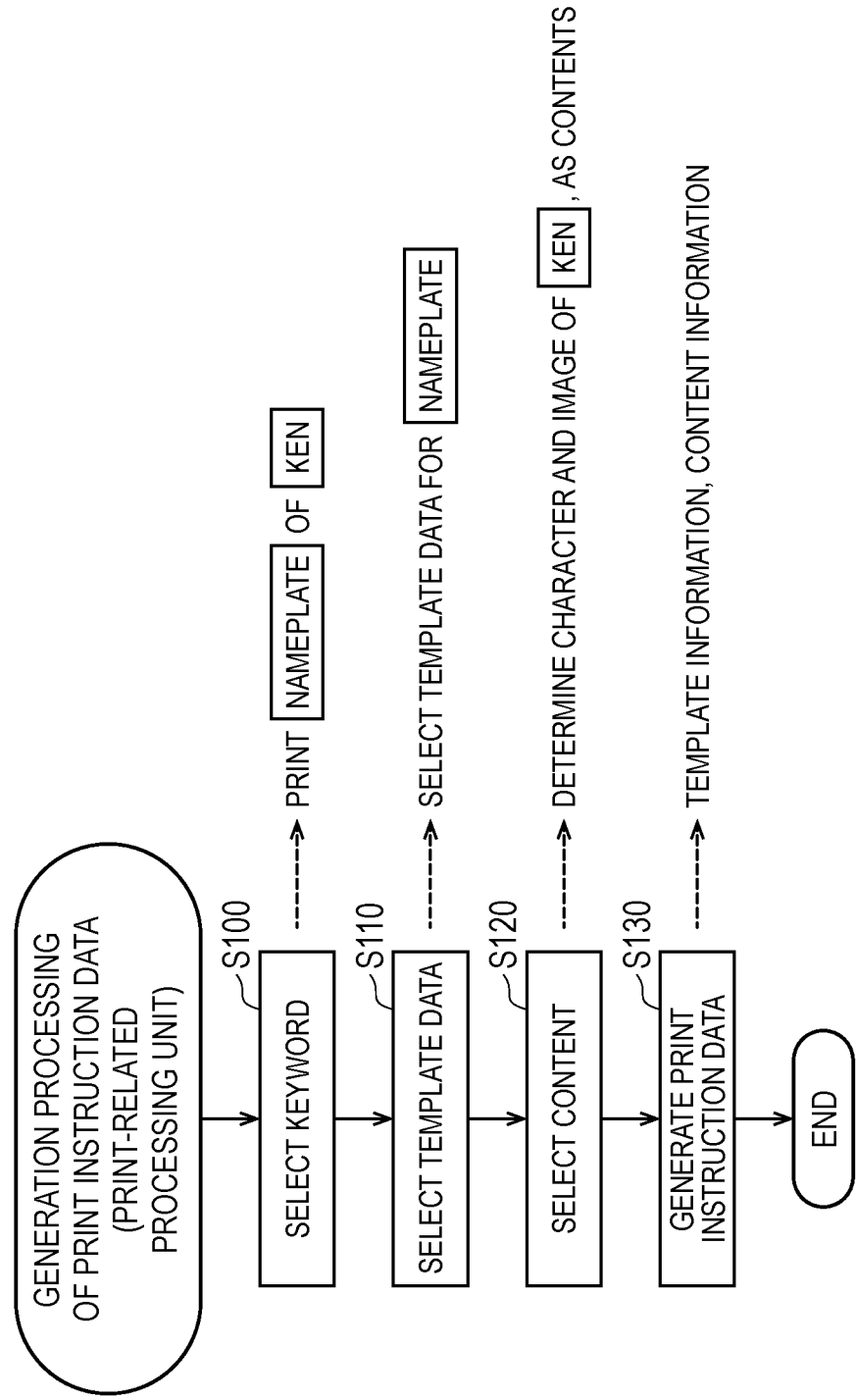

SYSTEM, METHOD OF CONTROLLING SPECIFIC PRINTER, NON-TRANSITORY COMPUTER-READABLE STORAGE MEDIUM, TERMINAL DEVICE, AND COMBINATION OF NON-TRANSITORY COMPUTER-READABLE STORAGE MEDIA

CROSS-REFERENCE TO RELATED APPLICATION

This application is based upon and claims the benefit of priority from prior Japanese patent application No. 2019-033694, filed on Feb. 27, 2019, the entire content of which are incorporated herein by reference.

TECHNICAL FIELD

The present disclosure relates to technology of controlling a specific printer by using a terminal device.

BACKGROUND

A technology of handling sound data by using a server is known. For example, in a system disclosed in JP-A-2012-73739, when a caregiver inputs service content to a mobile phone with voice, sound data is transmitted to a server. The server recognizes and analyzes the sound data by a voice recognition function, and converts the same into text data. A text indicated by the text data is displayed on a display unit of the mobile phone, and the displayed text is used for input of the service content.

However, in the above technology, a case in which a device to which voice is to be input and a device to be controlled are different is not considered. For this reason, for example, in a case in which the device to be controlled (for example, a printer) cannot perform communication with any one of the terminal device to which voice is to be input and the server, it may be difficult to control the device according to the voice.

SUMMARY

An object of the present disclosure is provide a technology by which, even in a case where a specific printer cannot perform communication with any one of a device to which voice is to be input and a server, it is possible to cause the specific printer to execute a print job according to the voice.

[First disclosure] A combination of a first non-transitory computer-readable storage medium storing a first computer program and a second non-transitory computer-readable storage medium storing a second computer program,
the first computer program, when executed by a computer mounted on a server, is configured to cause the server to perform:
acquiring input data generated based on sound data indicating voice uttered by an utterer and transmitted from a voice input device to which the voice is input; and
outputting print instruction data indicating an instruction relating to a print job to be executed by a specific printer, by using the input data, and
the second computer program, when executed by a computer mounted on a terminal device including a first communication interface and a second communication interface different from the first communication interface, is configured to cause the terminal device, to perform:
receiving the print instruction data transmitted from the server via the first communication interface;
generating print job data indicating a print job to be executed by the specific printer, by using the print instruction data; and
transmitting the print job data to the specific printer via the second communication interface.

According to the first disclosure, even in a case where the specific printer cannot perform communication with any one of the voice input device and the server, it is possible to cause the specific printer to execute a print job according to the voice to be input to the voice input device.

[Second disclosure] A system that controls a specific printer, the system indicating:
a server indicating:
an input acquisition unit configured to acquire input data generated based on sound data indicating voice uttered by an utterer and transmitted from a voice input device to which the voice is input; and
a print instruction output unit configured to output print instruction data indicating an instruction relating to a print job to be executed by the specific printer, by using the input data; and
a terminal device indicating:
a first communication interface;
a second communication interface different from the first communication interface;
a print instruction receiving unit configured to receive the print instruction data transmitted from the server via the first communication interface;
a print job generation unit configured to generate print job data indicating a print job to be executed by the specific printer, by using the print instruction data; and
a print job transmission unit configured to transmit the print job data to the specific printer via the second communication interface.

According to the second disclosure, even in a case where the specific printer cannot perform communication with any one of the voice input device and the server, it is possible to cause the specific printer to execute a print job according to the voice to be input to the voice input device.

[Third disclosure] A method of controlling a specific printer,
the method indicating steps, which are performed by a server, of:
acquiring input data generated based on sound data indicating voice uttered by an utterer and transmitted from a voice input device to which the voice is input; and
outputting print instruction data indicating an instruction relating to a print job to be executed by the specific printer, by using the input data, and
the method indicating steps, which are performed by a terminal device including a first communication interface and a second communication interface different from the first communication interface, of:
receiving the print instruction data transmitted from the server via the first communication interface;
generating print job data indicating a print job to be executed by the specific printer, by using the print instruction data; and
transmitting the print job data to the specific printer via the second communication interface.

According to the third disclosure, even in a case where the specific printer cannot perform communication with any one of the voice input device and the server, it is possible to cause the specific printer to execute a print job according to the voice to be input to the voice input device.

[Fourth disclosure] A non-transitory computer-readable storage medium storing a computer program, when executed by a computer mounted on a terminal device including a first communication interface and a second communication interface different from the first communication interface, configured to cause the terminal device to perform:

receiving print instruction data indicating a print instruction relating to a print job to be executed by a specific printer and transmitted from a server via the first communication interface, the print instruction data being generated in the server based on sound data indicating voice uttered by an utterer and transmitted from a voice input device to which the voice is input to the server;

generating print job data indicating the print job to be executed by the specific printer, by using the print instruction data; and transmitting the print job data to the specific printer via the second communication interface.

[Fifth disclosure] A terminal device indicating:

a first communication interface;

a second communication interface different from the first communication interface;

a print instruction receiving unit configured to receive print instruction data indicating a print instruction relating to a print job to be executed by a specific printer and transmitted from a server via the first communication interface, the print instruction data being generated in the server based on sound data indicating voice uttered by an utterer and transmitted from a voice input device to which the voice is input to the server;

a print job generation unit configured to generate print job data indicating the print job to be executed by the specific printer, by using the print instruction data; and a print job transmission unit configured to transmit the print job data to the specific printer via the second communication interface.

According to the fourth disclosure and the fifth disclosure, even in a case where the specific printer cannot perform communication with any one of the voice input device and the server, it is possible to cause the specific printer to execute a print job according to the voice to be input to the voice input device.

In the meantime, the technology disclosed in the present disclosure can be implemented in diverse forms such as a printing method, a control method of the terminal device, a computer program for performing functions of a device or the method, a recording medium having the computer program recorded thereon, and the like.

BRIEF DESCRIPTION OF DRAWINGS

FIGS. 2A to 2C depict examples of a correspondence table group CT.

FIG. 3 is a sequence diagram of printing control processing that is to be executed by the system 1000.

FIG. 4 is a flowchart of generation processing of print instruction data.

DETAILED DESCRIPTION

A. Example

A-1: Configuration of System 1000

Figure 1:
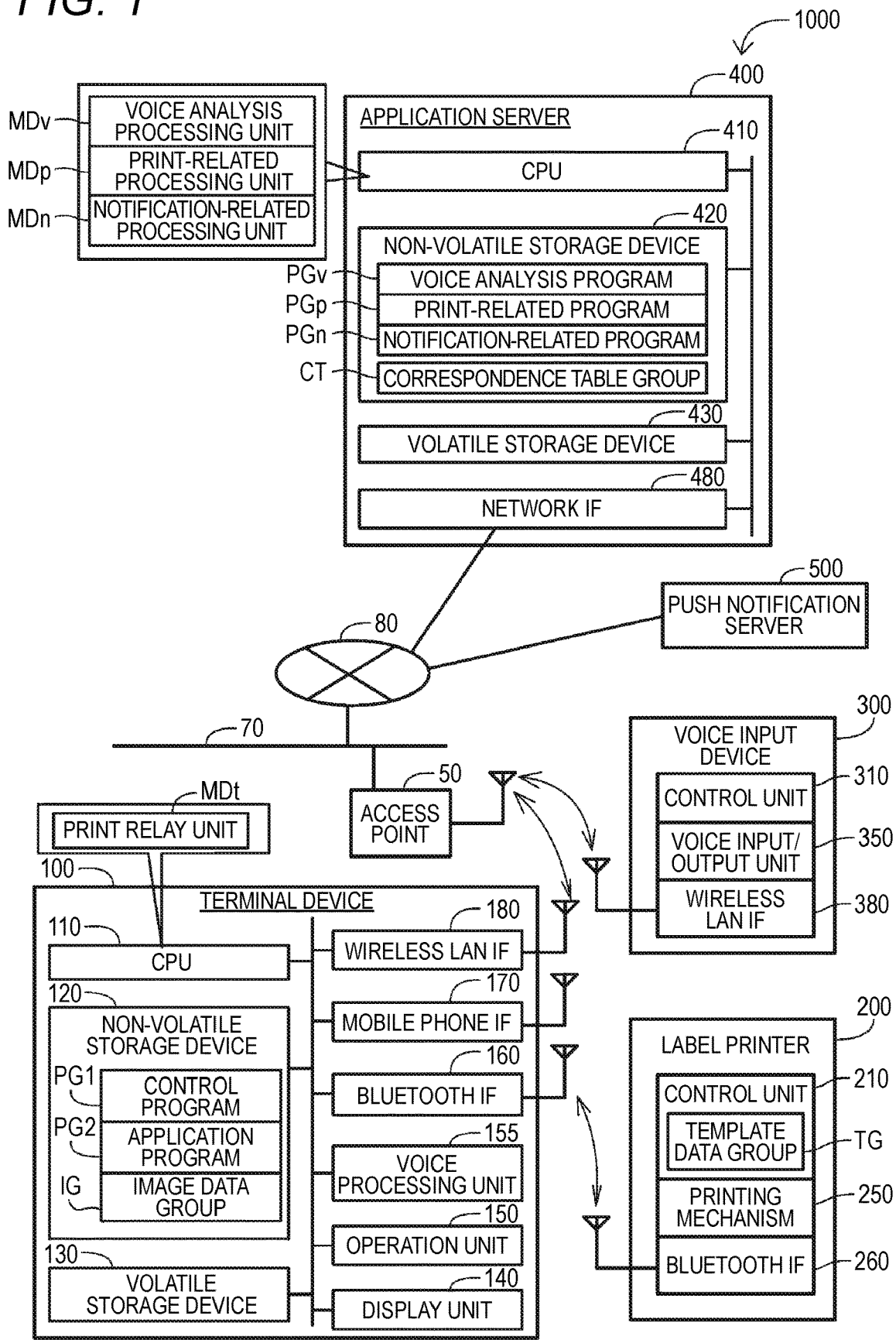
FIG. 1 is a block diagram depicting a configuration of a system 1000.

FIG. 1 is a block diagram depicting a configuration of a system 1000. The system 1000 includes a terminal device 100, a label printer 200 (an example of a printer), a voice input device 300, an application server 400, a push notification server 500, and a wireless access point 50. In the meantime, in the system 1000, as an example, the terminal device 100, the label printer 200 and the voice input device 300 are devices that are used by the same user.

The access point 50 performs functions as an access point of a wireless LAN by using a communication method conforming to IEEE (an abbreviation of The Institute of Electrical and Electronics Engineers, Inc.) 802.11a/b/g/n standards, for example. The access point 50 is connected to a local area network 70. The local area network 70 is a wired network established on the basis of Ethernet (registered trademark) standards. The local area network 70 is connected to the Internet 80. The application server 400 and the push notification server 500 are connected to the Internet 80.

The terminal device 100 is, for example, a calculator that is to be used by a user of the label printer 200 and the voice input device 300, and is a mobile terminal such as a smart phone, for example. The terminal device 100 is not limited to the mobile terminal, and may be a desktop computer. The terminal device 100 includes a CPU 110 as a controller which controls the terminal device 100, a non-volatile storage device 120 such as a flash memory and a hard disk, and a volatile storage device 130 such as a RAM. The terminal device 100 further includes, for example, a display unit 140 including a liquid crystal panel superimposed on a touch panel, an operation unit 150 including a touch panel, operation keys and the like, a voice processing unit 155 including a speaker and a microphone and performing a phone function and the like, a Bluetooth (registered trademark) interface (IF) 160 (an example of a second communication interface), a mobile phone IF 170, and a wireless LAN IF 180 (an example of a first communication interface).

The wireless LAN IF 180 includes an antenna, and performs wireless communication by using a communication method conforming to IEEE802.11a/b/g/n standards, for example. For example, the wireless LAN IF 180 can connect to the local area network 70 and the Internet 80 via the access point 50. Thereby, the terminal device 100 is communicatively connected to the application server 400 and the push notification server 500.

The Bluetooth IF 160 includes an antenna, is an interface for performing near field communication conforming to Bluetooth standards, and is also an interface for wirelessly connecting the terminal device 100 and a local device such as a printer, a speaker, a keyboard and the like. The terminal device 100 is communicatively connected to the label printer 200 via the Bluetooth IF 160.

The mobile phone IF 170 includes an antenna, and performs wireless communication with a base station (not shown) according to a mobile phone communication method (for example, W-CDMA). The mobile phone IF 170 is used, for example, for telephone and connection to the Internet 80 via the base station. The terminal device 100 is also communicatively connected to the application server 400 and the push notification server 500 via the mobile phone IF 170.

The volatile storage device 130 is provided with a buffer area in which a variety of intermediate data, which is generated when the CPU 110 executes processing, is to be temporarily stored.

In the non-volatile storage device 120, a control program PG1 and an application program PG2 are stored. The control program PG1 is a program for performing basic functions of the terminal device 100 such as functions of an OS (operating system), a phone function and the like. The control program PG1 is, for example, manufactured by a manufacturer of the terminal device 100 and is stored in advance upon shipment. The application program PG2 includes a program for performing functions relating to control of the label printer 200. The application program PG2 is a program (referred to as "application" or the like) for adding a new function to the terminal device 100, and is provided by a provider (for example, a manufacturer of the label printer 200) different from the manufacturer of the terminal device 100 so that it can be downloaded from a predetermined server, for example. The application program PG2 may be, for example, provided by the manufacturer of the terminal device 100 and may be stored in advance upon shipment.

The CPU 110 executes the control program PG1 to perform the basic functions of the terminal device 100. The CPU 110 executes the application program PG2 to function as a print relay unit MDt. As described later, the print relay unit MDt causes the label printer 200 to execute a printing, in cooperation with the voice input device 300, the application server 400 and the push notification server 500.

In the non-volatile storage device 120, an image data group IG including a plurality of image data is further stored. The image data included in the image data group IG is used as content data when generating print job data in printing control processing which will be described later. The image data group IG is generated by the user of the terminal device 100 and is stored in the non-volatile storage device 120.

The label printer 200 includes a control unit 210 including a CPU and a memory, a printing mechanism 250 which executes a printing according to control of the control unit 210, and a Bluetooth IF 260. The printing mechanism 250 is a mechanism configured to print an image on a label sheet to be attached on an article. The printing mechanism 250 is, for example, a thermal type printing mechanism including a print head having a plurality of (for example, hundreds of) heat generating elements. The print head heats positions on the sheet, on which dots are to be formed, by using the heat generating elements according to control of the control unit 210 to form the dots on the sheet. The Bluetooth IF 260 includes an antenna, is an interface for performing near field communication conforming to the Bluetooth standards, and is used for communication with the terminal device 100, as described above.

In the memory of the control unit 210, a template data group TG including a plurality of template data is stored. The template data group TG is used when printing a print image in printing control processing, which will be described later.

The label printer 200 includes the Bluetooth IF 260, but does not include a wireless LAN IF and a mobile phone IF. For this reason, the label printer 200 is communicatively connected to the terminal device 100 but cannot perform communication with the application server 400, the push notification server 500, and the voice input device 300.

The voice input device 300 is a device configured to execute specific processing according to voice that is to be uttered by the user. The specific processing includes, for example, processing of generating sound data and transmitting the sound data to the application server 400, in printing control processing which will be described later. The voice input device 300 includes a control unit 310 including a CPU and a memory, a voice input/output unit 350, and a wireless LAN IF 380. The voice input/output unit 350 includes a speaker and a microphone, and executes processing relating to input and output of voice. For example, the voice input/output unit 350 detects voice uttered by the user and to generate sound data indicating the voice, according to control of the control unit 310. The wireless LAN IF 380 includes an antenna, and performs wireless communication by using a communication method conforming to IEEE802.11a/b/g/n standards, for example. Thereby, the voice input device 300 is connected to the local area network 70 and the Internet 80 via the access point 50. Thereby, the voice input device 300 is communicatively connected to the application server 400. The voice input device 300 is, for example, a smart speaker such as Amazon Echo (Amazon is a registered trademark).

The application server 400 is, for example, a server that is operated by a business operator, which provides a so-called cloud service. The application server 400 includes a CPU 410 as a controller of the application server 400, a non-volatile storage device 420 such as a hard disk drive, and a volatile storage device 430 such as a RAM. The application server 400 further includes a network IF 480 for connection to the Internet 80. In the meantime, in FIG. 1, the application server 400 is conceptually shown as one calculator but is actually a so-called cloud server including a plurality of calculators communicatively connected to each other.

The volatile storage device 430 is provided with a buffer area in which a variety of intermediate data, which is generated when the CPU 410 executes processing, is to be temporarily stored. In the non-volatile storage device 420, a voice analysis program PGv, a print-related program PGp, and a notification-related program PGn are stored. The voice analysis program PGv and the notification-related program PGn are provided in such an aspect that an operator of the application server 400 uploads the same to the application server 400, for example. The print-related program PGp is provided in such an aspect that a business operator, which provides a print service (which will be described later) by using resources of the application server 400, for example, a business operator, which manufactures the label printer 200, uploads the same to the application server 400. In the meantime, in a modified example, all or a part of the voice analysis program PGv and the notification-related program PGn may be provided by the business operator, which manufactures the label printer 200. Alternatively, all or a part of the print-related program PGp may be provided by the business operator, which operates the application server 400.

The application server 400 (CPU 410) executes the voice analysis program PGv to function as a voice analysis processing unit MDv. The voice analysis processing unit MDv executes voice recognition processing and morpheme analysis processing. The voice recognition processing is processing of analyzing sound data and generating text data indicating content of utterance indicated by the sound data. The morpheme analysis processing is processing of analyzing the text data, extracting constituent units (referred to as 'morpheme') such as words included in the content of utterance and specifying types of the extracted morphemes (for example, types of parts of speech). The functions as the voice analysis processing unit MDv are performed using "Alexa Voice Service (Alexa is a registered trademark)", for example.

The application server 400 (CPU 410) executes the print-related program PGp to function as a print-related processing unit MDp. The print-related processing unit MDp executes processing of generating print instruction data, which will be described later, by using the text data obtained as a result of the analysis of the sound data, for example.

The application server 400 (CPU 410) executes the notification-related program PGn to function as a notification-related processing unit MDn. The notification-related processing unit MDn executes processing relating to push notification including the print instruction data. The functions as the notification-related processing unit MDn are performed by using "Amazon Simple Notification Service (Amazon is a registered trademark)", for example.

In the non-volatile storage device 420, a correspondence table group CT is further stored. FIGS. 2A to 2C depict examples of the correspondence table group CT. The correspondence table group CT includes a transmission destination selection table CT1, a template selection table CT2, and a content selection table CT3.

The transmission destination selection table CT1 shown in FIG. 2A is a table in which a list of user IDs and a list of device tokens DTK corresponding to the user IDs are recorded with being associated with each other. The user ID is an example of identification information, and for example, is a user ID distributed to the user of the voice input device 300 from the business operator, which manufactures the voice input device 300. Instead of this configuration, the user ID may be an ID distributed to the user of the label printer 200 from the business operator, which manufactures the voice input device 300, or may be an ID distributed from the user of the terminal device 100 from a business operator, which manufactures the terminal device 100 or the OS of the terminal device 100. The device token DTK is an identifier allotted to a combination of the terminal device 100 and the application program PG2. The device token DTK is used so as to designate a transmission destination of the push notification. The device token DTK is to identify a terminal device (for example, the terminal device 100) of the transmission destination of the push notification and to identify an application program (for example, the application program PG2) of the transmission destination of the push notification of one or more application programs installed in the terminal device of the transmission destination.

The template selection table CT2 shown in FIG. 2B is a table in which a list of words for template selection and a list of template data corresponding to the words are recorded with being associated with each other. The template selection table CT2 is used so as to select template data in generation processing of the print instruction data, which will be described later.

The content selection table CT3 shown in FIG. 2C is a table in which a list of words for content selection and a list of image data corresponding to the words are recorded with being associated with each other. The content selection table CT3 is used so as to select a content in generation processing of the print instruction data, which will be described later. The image data recorded in the list of the content selection table CT3 is, for example, image data included in the image data group IG stored in the non-volatile storage device 120 of the terminal device 100. In a modified example, the image data group IG may be stored in the application server 400 or may be stored in a storage server which provides a separate storage service.

The push notification server 500 is a server that is operated by a vendor of the OS of the terminal device 100, for example. Although not shown, the push notification server 500 includes a control unit, which includes a CPU as a controller of the push notification server 500 and a memory, and a network IF for connection to the Internet 80. The push notification server 500 is a server for transmitting a push notification to an application that operates on a specific platform such as Android (registered trademark) or iOS (registered trademark). The push notification server 500 transmits a push notification to the terminal device 100, in response to an instruction of the application server 400 (notification-related processing unit MDn), for example. The push notification can be spontaneously transmitted from the push notification server 500, regardless of whether there is a request from the terminal device 100.

A-2. Preliminary Preparation

The user registers the user ID and the device token DTK before using a function of causing the label printer 200 to execute a printing with the voice input device 300. For example, when the application program PG2 is first executed on the terminal device 100, i.e., when the print relay unit MDt is first activated, the print relay unit MDt (CPU 110) displays a UI screen for requesting permission to receive a push notification to the user. The user inputs a user ID and also inputs permission of the push notification to the terminal device 100 through the UI screen. When the user's permission is acquired, the print relay unit MDt of the terminal device 100 transmits a request for generation of a device token DTK to the push notification server 500. When the push notification server 500 receives the request for generation, the push notification server generates and transmits a device token DTK to the terminal device 100. The print relay unit MDt of the terminal device 100 transmits the device token DTK and the user ID to the application server 400. The print-related processing unit MDp of the application server 400 associates the device token DTK and the user ID each other, and registers the same in the transmission destination selection table CT1.

In addition, the user accesses the voice input device 300 by using the terminal device 100 or another terminal device (for example, a computer), for example, and registers the user ID in the memory (not shown) of the voice input device 300.

The print relay unit MDt of the terminal device 100 makes the template selection table CT2 and the content selection table CT3, based on the user's input, and uploads the same to the application server 400. The application server 400 manages and stores the template selection table CT2 and the content selection table CT3 for each user (for each user ID).

A-3. Printing Control Processing

FIG. 3 is a sequence diagram of printing control processing that is to be executed by the system 1000. The printing control processing is processing of causing the label printer 200 to execute a printing in cooperation with the terminal device 100, the voice input device 300, the application server 400 and the push notification server 500. The printing control processing starts when the voice input device 300 detects voice uttered by the user.

In S2, the voice input device 300 generates sound data indicating voice uttered by the user (utterer). For example, when voice "Print a nameplate of Ken" is input to the voice input device 300, sound data indicating the voice is generated.

In S4, the voice input device 300 transmits the sound data and the registered user ID to the voice analysis processing unit MDv of the application server 400. For the transmission, a well-known protocol, for example, HTTP (an abbreviation of Hypertext Transfer Protocol) is used.

When the application server 400 receives the sound data and the user ID, in S6, the voice analysis processing unit MDv of the application server 400 analyzes the received sound data. Specifically, the voice recognition processing is executed for the sound data, so that text data indicating the voice indicated by the sound data is generated. For example, when the sound data indicating the voice "Print a nameplate of Ken" is acquired, text data indicating a content of the voice is generated by the voice analysis processing unit MDv. The voice analysis processing unit MDv further executes the morpheme analysis processing for the text data. Thereby, for example, words such as "Ken", "nameplate", "Print" and the like are extracted, and types of the parts of speech of the words (for example, noun and verb) are specified. The voice analysis processing unit MDv generates a list in which the types of the parts of speech are associated with the extracted words, as a result of the morpheme analysis.

In S8, the voice analysis processing unit MDv transfers the generated text data, the morpheme analysis result, and the user ID received from the voice input device 300 to the print-related processing unit MDp. For example, the voice analysis processing unit MDv stores the text data, the morpheme analysis result, and the user ID in a predetermined area of the volatile storage device 430, and calls the print-related processing unit MDp.

When the text data, the morpheme analysis result, and the user ID are received from the voice analysis processing unit MDv, in S10, the print-related processing unit MDp executes generation processing of the print instruction data by using the text data and the morpheme analysis result.

FIG. 4 is a flowchart of the generation processing of the print instruction data. In S100, the print-related processing unit MDp selects a word, which is to be used for generation of the print instruction data, from the words extracted as a result of the morpheme analysis. For example, the print-related processing unit MDp refers to the template selection table CT2 and the content selection table CT3 corresponding to the received user ID, and selects a word included in the list of words for template selection and a word included in the list of words for content selection from the words extracted as a result of the morpheme analysis. In the example of FIG. 4, "nameplate" is selected as a word for template selection, and "Ken" is selected as a word for content selection.

In S110, the print-related processing unit MDp selects template data to be used, based on the word selected for template selection. For example, in a case in which the word selected for template selection is "nameplate", the print-related processing unit MDp selects, as the template data to be used, template data C associated with "nameplate" in the template selection table CT2.

In S120, the print-related processing unit MDp selects content to be printed, based on the word selected for content selection. For example, in a case in which the word selected for content selection is "Ken", the print-related processing unit MDp selects the character "Ken", as one content. The print-related processing unit MDp selects image data B associated with "Ken" in the content selection table CT3, as one content.

In S130, the print-related processing unit MDp generates print instruction data. The print instruction data includes template information, which indicates the template data selected in S110, and content information, which indicates the content selected in S120. The template information is, for example, a template number allotted in advance to the template data C for the selected nameplate. The content information is, for example, a file name of the text data indicating the character "Ken" and a file name of the image data B indicating the image of "Ken".

In S12 of FIG. 3, the print-related processing unit MDp specifies a device token DTK indicating a transmission destination of the print instruction data. Specifically, the print-related processing unit MDp refers to the transmission destination selection table CT1, and specifies the device token DTK corresponding to the user ID received in S8, as the device token DTK indicating the transmission destination. In the present example, the transmission destination specified by the specified device token DTK is the print relay unit MDt of the terminal device 100.

In S14, the print-related processing unit MDp passes the print instruction data generated in S10 and the device token DTK specified in S12 to the notification-related processing unit MDn. For example, the notification-related processing unit MDn stores the print instruction data and the device token DTK in a predetermined area of the volatile storage device 430, and calls the notification-related processing unit MDn.

When the print instruction data and the device token DTK are received from the print-related processing unit MDp, in S16, the notification-related processing unit MDn transmits a push notification request to the push notification server 500. The push notification request is to request the push notification server 500 to transmit a push notification including the print instruction data to the transmission destination specified by the device token DTK. The push notification includes the print instruction data and the device token DTK.

When the push notification server 500 receives the push notification request, in S18, the push notification server 500 transmits the push notification to the print relay unit MDt of the terminal device 100, which is the transmission destination indicated by the device token DTK. The push notification includes the print instruction data transmitted from the application server 400 (notification-related processing unit MDn) in S16. The terminal device 100 receives the push notification via the wireless LAN IF 180.

When the terminal device 100 receives the push notification including the print instruction data, in S20, the print relay unit MDt of the terminal device 100 generates print job data by using the print instruction data included in the push notification. The print job data is data indicating a print job that is to be executed by the label printer 200, and includes an image description file indicating a print image PI.

Figure 5A:
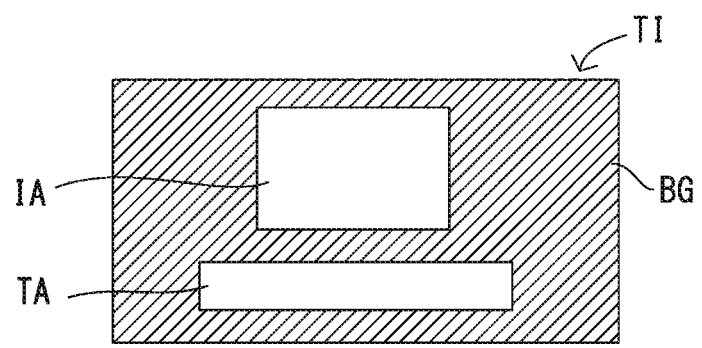
FIG. 5A depicts an example of a template image TI.
Figure 5B:
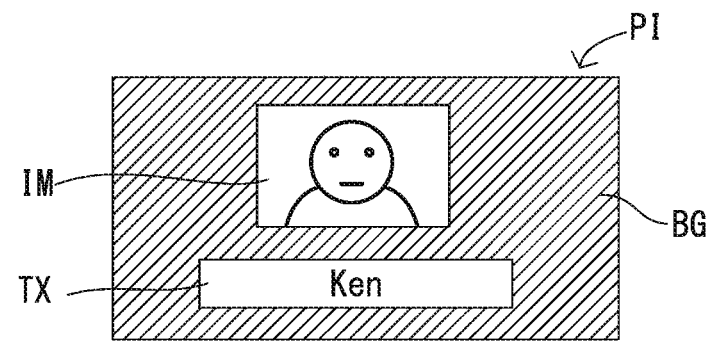
FIG. 5B depicts an example of a print image PI.

FIG. 5A depicts an example of a template image TI. FIG. 5B depicts an example of a print image PI. The template image TI shown in FIG. 5A is a template image indicated by the template data C for nameplate. The template image TI includes a background image BG, and two content arrangement regions, specifically, an image arrangement region IA, and a text arrangement region TA.

The print image PI shown in FIG. 5B is an image obtained by arranging a designated image IM in the image arrangement region IA of the template image TI shown in FIG. 5A and arranging a designated text TX in the text arrangement region TA. The print relay unit MDt generates, as the image description file indicating the print image PI, a file including information indicating the template data C, information indicating that the designated text TX to be arranged in the text arrangement region TA is "Ken", and designated image data indicating the designated image IM to be arranged in the image arrangement region IA. The image description file is a file that is described according to an XML (an abbreviation of Extensible Markup Language), for example. The designated image data is image data that is acquired from the image data group IG and is designated by the content information included in the print instruction data.

In S22, the print relay unit MDt transmits the generated print job data to the label printer 200 via the Bluetooth IF 160. The label printer 200 receives the print job via the Bluetooth IF 260. Here, before transmitting the generated print job data to the label printer 200, an image indicating the print image PI (FIG. 5B) may be displayed on the display unit 140 so as to inquire the user whether to continue the printing. Thereby, it is possible to check whether a desired print image uttered by the user has been formed, before the printing.

When the label printer 200 receives the print job data, in S24, the control unit 210 of the label printer 200 controls the printing mechanism 250 to print the print image PI according to the print job data. For example, the control unit 210 generates print image data (rasterized data) indicating the print image PI, based on the image description file included in the print job data (rasterization processing). For example, the control unit 210 selects the template data C designated by the print job, from the template data group TG. The control unit 210 generates print image data indicating the print image PI (FIG. 5B) by using the template data C, the image data indicating the designated image IM included in the print job data and the text data indicating the designated text TX. The control unit 210 causes the printing mechanism 250 to print the print image PI by using the print image data.

According to the above-described example, the print-related processing unit MDp of the application server 400 acquires, as the input data generated based on the sound data transmitted from the voice input device 300, the text data and the morpheme analysis result (S8). The print-related processing unit MDp outputs the print instruction data, which indicates an instruction relating to the print job to be executed by the label printer 200, by using the text data and the morpheme analysis result (S14). The print relay unit MDp of the terminal device 100 receives, as the push notification via the push notification server 500, the print instruction data transmitted from the application server 400 via the wireless LAN IF 180 as a first communication interface (S18). The print relay unit MDt generates the print job data, which indicates the print job to be executed by the label printer 200, by using the print instruction data (S20). The print relay unit MDt transmits the print job data to the label printer 200 via the Bluetooth IF 160 as a second communication interface (S22).

As a result, even in a case where the label printer 200 cannot perform communication with the voice input device 300 or the application server 400, it is possible to cause the label printer 200 to execute the print job according to the voice input to the voice input device 300. The label printer 200 or the voice input device 300 may have only a limited communication interface due to miniaturization or cost saving. For example, the label printer 200 has the Bluetooth IF 260 but does not have the wireless LAN IF. The voice input device 300 has the wireless LAN IF 380 but does not have the Bluetooth IF. For this reason, the label printer 200 cannot perform communication with the voice input device 300 and the application server 400. Even in this case, the user can cause the label printer 200 to print the desired print image PI simply by inputting the content of the print image PI desired to be printed to the voice input device 300 with voice.

According to the above example, the print-related processing unit MDp acquires the user ID, as the identification information to be transmitted with being associated with the sound data, from the voice input device 300 (S8). The print-related processing unit MDp outputs the device token DTK for specifying one terminal device 100, to which the print instruction data is transmitted, out of the plurality of terminal devices based on the user ID (S12, S14). As a result, since the device token DTK is output from the application server 400, the push notification including the print instruction data is appropriately transmitted to the terminal device 100, which is the transmission destination.

According to the above example, the label printer 200 includes the memory as a storage unit in which the template data indicating the template image TI including the content arrangement regions IA and TA is stored (FIG. 1). The print-related processing unit MDp generates the print job data including the information indicating the content images (the designated text TX and the designated image IM (FIG. 5B)) to be arranged in the content arrangement regions, by using the print instruction data (S20). The label printer 200 prints the print image PI including the content arrangement regions, in which the content images (the designated text TX and the designated image IM) are arranged, by using the template data and the print job data. As a result, it is possible to easily cause the label printer 200 to print the print image PI, which includes the content images, by using the template data prepared in advance.

According to the above example, the application server 400 is connected to the Internet 80, the wireless LAN IF 180 of the terminal device 100 is an interface for connection to the Internet 80, and the Bluetooth IF 160 of the terminal device 100 is an interface for connection to the local device (for example, the label printer 200). As a result, even in a case where the label printer 200 is not connected to the Internet 80, it is possible to cause the label printer 200 to execute the printing according to the voice input to the voice input device 300 as long as the label printer is connected to the terminal device 100 via the Bluetooth IF 160.

B. Modified Examples (1) In the above example, the processing of analyzing the sound data is executed by the voice analysis processing unit MDv of the application server 400. Instead of this configuration, a part or all of the processing of analyzing the sound data may be executed by the voice input device 300. A part or all of the processing of analyzing the sound data may be executed by the print-related processing unit MDp. For example, the voice analysis processing unit MDv may execute only the processing of executing the voice recognition processing to generate the text data, and the morpheme analysis processing of extracting a word may be executed by the print-related processing unit MDp.

(2) In the above example, the user ID is used as the identification information associated with the device token DTK. However, the present disclosure is not limited thereto. The identification information may be, for example, a MAC address or an IP address allotted to the voice input device 300.

(3) In the above example, the transmission of the print instruction data from the application server 400 to the terminal device 100 is performed by the push notification via the push notification server 500. Instead of this configuration, for example, the terminal device 100 may periodically inquire the application server 400 whether there is the print instruction data (which is also referred to as 'polling'), and the application server 400 may transmit the print instruction data to the terminal device 100, in response to the inquiry.

The application server 400 may directly transmit the push notification to the terminal device 100 without via the push notification server 500.

(4) Instead of the label printer 200, a printer which executes a printing in an inkjet or electrophotographic manner may be adopted. A complex machine having a printing mechanism corresponding to such a manner and operating as a printer may also be adopted. In this case, for example, it is possible to cause the printer or complex machine to execute a printing according to the voice input to the voice input device 300.

(5) The sound data input in the above example and the print instruction data generated based on the sound data are exemplary and the present disclosure is not limited thereto. For example, the sound data may be sound data indicating an utterance content ("Print a file of AAA") including a file name. In this case, the print instruction data may be data indicating the file name included in the utterance content. The print instruction data may include, as the content information, the text data indicating the character. In the non-volatile storage device 420 of the application server 400, the template selection table CT2 and the content selection table CT3, which are referred to by the print-related processing unit MDp, may not be stored. In this case, for example, data, which indicates a word ("Ken", in the above example) indicating the content and a word ("nameplate", in the above example) indicating the template, of the text data received from the voice analysis processing unit MDv may be included in the print instruction data, as it is. The template selection table CT2 and the content selection table CT3 are stored in the volatile storage device 130 of the terminal device 100. The print relay unit MDt of the terminal device 100 may refer to the tables CT2 and CT3 to select the template data or content to be used.

(6) In the above example, the label printer 200 generates the print image data by using the template data, and prints the print image PI by using the print data. Instead of this configuration, the template data may be stored in the non-volatile storage device 120 of the terminal device 100, and the print relay unit MDt of the terminal device 100 may generate the print data by using the template data and transmit the print data to the label printer 200. As described above, in a case in which the print instruction data is a file name, for example, the print relay unit MDt of the terminal device 100 may acquire an image file having the file name from the non-volatile storage device 120, generate the print image data by using the image file and transmit the print image data to the label printer 200.

(7) The application server 400 is a cloud server but may be a local server that is connected to the local area network 70 and is not connected to the Internet 80. In this case, only the sound data may be transmitted from the voice input device 300 to the application server 400 without transmitting the identification information such as the user ID. In this case, when the application server 400 receives the sound data from the voice input device 300, the application server may transmit the print instruction data based on the sound data to one preset terminal device 100.

(8) The interface for interconnecting the terminal device 100 and the local area network 70 is not limited to the wireless LAN IF, and may be, for example, a wired interface conforming to Ethernet (registered trademark). The interface for interconnecting the terminal device 100 and the label printer 200 is not limited to the Bluetooth IF 160, and may be, for example, a wired interface such as a USB (an abbreviation of Universal Serial Bus) or other wireless interface such as NFC (an abbreviation of Near field communication).

(9) In the above examples, some of the configurations performed by the hardware may be replaced with software. Some of the configurations performed by the software may be replaced with hardware.

Although the present disclosure is described with reference to the examples, the examples are provided so as to easily understand the present disclosure, not to limit the present disclosure. The present disclosure can be changed and improved without departing from the gist thereof and the claims, and includes equivalents thereof.

What is claimed is:

1. A combination of a first non-transitory computer-readable storage medium storing a first computer program and a second non-transitory computer-readable storage medium storing a second computer program, the first computer program, when executed by a computer of a server, is configured to cause the server to perform:
acquiring input data generated based on sound data indicating voice uttered by an utterer and transmitted from a voice input device to which the voice is input;
acquiring identification information transmitted from the voice input device with being associated with the sound data;
outputting print instruction data indicating an instruction relating to a print job to be executed by a specific printer, by using the input data; and
outputting terminal information for specifying one terminal device, to which the print instruction data is transmitted, out of a plurality of terminal devices based on the identification information; and the second computer program, when executed by a computer of a terminal device including a LAN interface and a BLUETOOTH interface, is configured to cause the terminal device, to perform:
receiving the print instruction data transmitted from the server via the LAN interface;
generating print job data indicating the print job to be executed by the specific printer, by using the print instruction data which is received from the server via the LAN interface and which is output by the server by using the input data generated based on the sound data indicating voice uttered by an utterer; and
transmitting the print job data to the specific printer via the BLUETOOTH interface.

2. The combination of non-transitory computer-readable storage media according to claim 1,
wherein the server is connected to the Internet,
the LAN interface is an interface for connection to the Internet, and
the BLUETOOTH interface is an interface for connection to a local device including the specific printer.

3. A combination of a first non-transitory computer-readable storage medium storing a first computer program and a second non-transitory computer-readable storage medium storing a second computer program, the first computer program, when executed by a computer of a server, is configured to cause the server to perform:
acquiring input data generated based on sound data indicating voice uttered by an utterer and transmitted from a voice input device to which the voice is input; and
outputting print instruction data indicating an instruction relating to a print job to be executed by a specific printer, by using the input data, wherein the specific printer comprises a template storage unit configured to store template data indicating a template image including one or more content arrangement regions, the second computer program, when executed by a computer of a terminal device including a LAN interface and a BLUETOOTH interface, is configured to cause the terminal device, to perform receiving the print instruction data transmitted from the server via the LAN interface;

generating print job data indicating the print job to be executed by the specific printer, by using the print instruction data which is received from the server via the LAN interface and which is output by the server by using the input data generated based on the sound data indicating voice uttered by an utterer;

generating the print job data including information indicating a content image to be arranged in the content arrangement region, by using the print instruction data; and transmitting the print job data to the specific printer via the BLUETOOTH interface, wherein a print image including the content arrangement region in which the content image is arranged, by using the template data and the print job data, is printed by the specific printer.

4. A system that controls a specific printer, the system comprising:

a server comprising:

a controller configured to acquire input data generated based on sound data indicating voice uttered by an utterer and transmitted from a voice input device to which the voice is input and acquire identification information transmitted from the voice input device with being associated with the sound data; and to output print instruction data indicating an instruction relating to a print job to be executed by the specific printer, by using the input data and to output terminal information for specifying one terminal device, to which the print instruction data is transmitted, out of a plurality of terminal devices based on the identification information; and a terminal device comprising:

a LAN interface;

a BLUETOOTH interface; and a controller configured to:

receive the print instruction data transmitted from the server via the LAN interface;

generate print job data indicating the print job to be executed by the specific printer, by using the print instruction data which is received from the server via the LAN interface and which is output by the server by using the input data generated based on the sound data indicating voice uttered by an utterer; and transmit the print job data to the specific printer via the BLUETOOTH interface.

5. A method of controlling a specific printer, the method comprising steps, which are performed by a server, of:

acquiring input data generated based on sound data indicating voice uttered by an utterer and transmitted from a voice input device to which the voice is input;

acquiring identification information transmitted from the voice input device with being associated with the sound data;

outputting print instruction data indicating an instruction relating to a print job to be executed by the specific printer, by using the input data; and outputting terminal information for specifying one terminal device, to which the print instruction data is transmitted, out of a plurality of terminal devices based on the identification information, the method comprising steps, which are performed by a terminal device including a LAN interface and a BLUETOOTH interface, of:

receiving the print instruction data transmitted from the server via the LAN interface;

generating print job data indicating the print job to be executed by the specific printer, by using the print instruction data which is received from the server via the LAN interface and which is output by the server by using the input data generated based on the sound data indicating voice uttered by an utterer; and transmitting the print job data to the specific printer via the BLUETOOTH interface.

6. A non-transitory computer-readable storage medium storing a computer program, when executed by a computer of a terminal device including a LAN interface and a BLUETOOTH interface, configured to cause the terminal device to perform:

receiving print instruction data indicating a print instruction relating to a print job to be executed by a specific printer and transmitted from a server via the LAN interface, the print instruction data being generated in the server based on sound data indicating voice uttered by an utterer and transmitted from a voice input device to which the voice is input to the server, wherein the specific printer comprises a template storage unit configured to store template data indicating a template image including one or more content arrangement regions;

generating print job data indicating the print job to be executed by the specific printer, by using the print instruction data which is received from the server via the LAN interface and which is output by the server by using input data generated based on the sound data indicating voice uttered by an utterer;

generating the print job data including information indicating a content image to be arranged in the content arrangement region, by using the print instruction data; and transmitting the print job data to the specific printer via the BLUETOOTH interface, wherein a print image including the content arrangement region in which the content image is arranged, by using the template data and the print job data, is printed by the specific printer.

7. A terminal device comprising:

a LAN interface;

a BLUETOOTH interface;

a controller configured to:

receive print instruction data indicating a print instruction relating to a print job to be executed by a specific printer and transmitted from a server via the LAN interface, the print instruction data being generated in the server based on sound data indicating voice uttered by an utterer and transmitted from a voice input device to which the voice is input to the server wherein the specific printer comprises a template storage unit configured to store template data indicating a template image including one or more content arrangement regions;

generate print job data indicating the print job to be executed by the specific printer, by using the print instruction data which is received from the server via the LAN interface and which is output by the server by using the input data generated based on the sound data indicating voice uttered by an utterer;

generate the print job data including information indicating a content image to be arranged in the content arrangement region, by using the print instruction data; and transmit the print job data to the specific printer via the BLUETOOTH interface, wherein a print image including the content arrangement region in which the content image is arranged, by using the template data and the print job data, is printed by the specific printer.

* * * * *